(12) United States Patent
Goldfein et al.

(10) Patent No.: US 8,537,664 B2
(45) Date of Patent: Sep. 17, 2013

(54) METHOD AND SYSTEM FOR ACCELERATING TRANSMISSION OF DATA BETWEEN NETWORK DEVICES

(71) Applicant: Saratoga Data Systems, Schenectady, NY (US)

(72) Inventors: Arnold Goldfein, Sunnyvale, CA (US); David Gariepy, Los Gatos, CA (US); Robert Cousins, Saratoga, CA (US); Laurence Brevard, San Jose, CA (US)

(73) Assignee: Saratoga Data Systems, Inc., Schenectady, NY (US)

( * ) Notice: Subject to any disclaimer, the term of this patent is extended or adjusted under 35 U.S.C. 154(b) by 0 days.

(21) Appl. No.: 13/660,149

(22) Filed: Oct. 25, 2012

(65) Prior Publication Data
US 2013/0054819 A1   Feb. 28, 2013

Related U.S. Application Data

(63) Continuation of application No. 12/041,489, filed on Mar. 3, 2008, now Pat. No. 8,310,920.

(51) Int. Cl.
*G01R 31/08* (2006.01)
*G06F 11/00* (2006.01)
*G08C 15/00* (2006.01)
*H04J 1/18* (2006.01)
*H04J 3/14* (2006.01)
*H04L 1/00* (2006.01)
*H04L 12/26* (2006.01)
*H04L 12/28* (2006.01)

(52) U.S. Cl.
USPC .......................................................... 370/229

(58) Field of Classification Search
None
See application file for complete search history.

(56) References Cited

U.S. PATENT DOCUMENTS

| 2004/0081199 A1* | 4/2004 | Lopez et al. ................. 370/468 |
| 2004/0100922 A1* | 5/2004 | Yegin ............................ 370/328 |
| 2006/0159098 A1* | 7/2006 | Munson et al. ............... 370/394 |

OTHER PUBLICATIONS

Y. Gu, R. Grossman, IETF Draft: UDT: A Transport Protocol for Data Intensive Applications, pp. 1-16, Aug. 2004.*
Y. Gu, UDT: A high Performance Data Transport Protocol, Thesis, University of Illinois at Chicago, pp. 1-109, First Presented in 2005, Current Version Published Jun. 2006.*
D. Clark, M. Lambert, L. Zheng, NETBLT: A High Throughput Transport Protocol, ACM SIGCOMM Computer Communication Review, vol. 17, issue 5, Oct. 1987, pp. 353-359.*
A. Mukerjee, L. Landweber, J. Strikwerda, Evaluation of Retransmission Strategies in a Local Area Network Environment, Performance Evaluation Review, vol. 17, May 1, 1989, pp. 98-107.*
W. Zwaenepoel, Protocols for Large Data Transfers over Local Networks, ACM Sigcomm Computer Communication Review, vol. 15, Issue 4, 1985, pp. 22-32.*

(Continued)

*Primary Examiner* — John Blanton
*Assistant Examiner* — Christopher Crutchfield
(74) *Attorney, Agent, or Firm* — Schneck & Schneck; David M. Schneck

(57) ABSTRACT

A method and system for transferring data between a sender and a receiver in a packet-based network is disclosed. The method comprises establishing a data channel, establishing a feedback channel, sending data to the receiver over the data channel, sending an acknowledgment to a sender on the feedback channel at a predetermined interval, using the acknowledgment to track data sent successfully and unsuccessfully to the receiver, resending data unsuccessfully sent to the receiver, and self-tuning to optimize throughput based upon the acknowledgement and react to changing network conditions.

3 Claims, 5 Drawing Sheets

(56) References Cited

OTHER PUBLICATIONS

Y. Gu, X. Hong, M. Mazzucco, R. Grossman, SABUL: A high performance Data Transfer Protocol, IEEE Communications Letters, pp. 1-3, 2003.*

M. Meiss, Tsunami: A High-Speed Rate-Controlled Protocol for File Transfer, 2002, pp. 1-9.*

E. He, J. Leigh, O. Yu, T. Defanti, Reliable Blast UDP: Predictable High Performance Bulk Data Transfer, IEEE Cluster Computing 2002, Sep. 2002, pp. 1-10.*

D. Clark, M. Lambert, L. Zhang, NETBLT : A Bulk Data Transfer Protocol, RFC 998, pp. 1-21, Mar. 1987.*

* cited by examiner

METHOD AND SYSTEM FOR ACCELERATING TRANSMISSION OF DATA BETWEEN NETWORK DEVICES

CROSS-REFERENCE TO RELATED APPLICATION

This application is a continuation of U.S. patent application Ser. No. 12/041,489, filed Mar. 3, 2008 which claims priority from U.S. Provisional Patent Application Ser. No. 60/892,601, filed Mar. 2, 2007.

TECHNICAL FIELD

The present invention relates generally to data communications, and more particularly, to a means of accelerating data transfer between a sending and a receiving device in a networked environment.

BACKGROUND

Inter-network nodes, or Internet-based nodes, are communication endpoints on a packet switched network of an inter-network and include, but are not limited to, computers, network routers, intermediate nodes on a network or inter-network, satellites, spacecraft, or any appliance or device that interfaces to a network or inter-network.

An amount of time required for data to propagate from a source node on an inter-network to the destination node on the inter-network is referred to as latency. Since some internal nodes operate as 'store and forward' devices, the end-to-end latency for a message can be much greater than a simple sum of point-to-point propagation times.

Examples of existing transfer protocols include Transmission Control Protocol (TCP) over Internet Protocol (IP). TCP is an explicitly windowed protocol. A sender and a receiver agree upon buffer sizes and then the sender tries to fill the receiver buffer without overflowing it. The sender's messages are based upon active acknowledgements of the receiver which indicate an amount of free space remaining in the receiver's buffer. The active acknowledgment also provides a form of flow control.

Another example of a similar transfer protocol is Apple's AppleTalk ADSP (AppleTalk Data System Protocol) which is also an explicitly windowed protocol. Additionally, Novell's SPX (Sequenced Packet Exchange) is a popular NetWare transport protocol. It was derived from the Xerox Networking Systems (XNS) Sequenced Packet Protocol (SPP).

With existing explicitly windowed inter-network protocols, which include but are not limited to TCP/IP, AppleTalk, and IPX, latency may limit the data transfer rate between any two nodes on the inter-network because the protocol requires the sender node to frequently stop sending data until some or all data sent thus far are acknowledged by the receiver node as successfully received. The acknowledgement is sent on the inter-network from the receiving node to the sending node and is itself subject to the network latency. The greater the network latency, the less data is sent per unit time, the lower average utilization of the channel, and the less the throughput of the protocol. Latency may limit the throughput of protocols of this type to significantly less that the capacity of the network.

FIG. 1 illustrates the latency problem for the TCP protocol in a TCP throughput graph 100. The latency issue graphically shown in FIG. 1 is similarly applicable to other explicitly windowed protocols as well.

Another way to describe the current practice is that it is pessimistic. In other words, the protocols require positive acknowledgement to proceed. The requirement for positive acknowledgement is based upon historic memory and bandwidth limits that are no longer applicable. In contrast, the throughput of the novel protocol, which is the subject of the present invention described herein, is largely independent of latency because it never stops sending data until the source of the data is exhausted. The novel protocol is optimistic in that it assumes that everything is fine and then deals with any failures as a matter of cleanup.

As a contemporaneous inter-network becomes congested, it loses data. Congested inter-network routers and other devices become overwhelmed with inter-network data and are forced to discard data they are expected to transmit. A common case is a router connecting several similar networks. If suddenly 100% of the traffic on three networks requires forwarding to a single network, the net amount of traffic intended for the single network may be more than a carrying capability of the physical network. Since most network technologies do not implement (or depend upon) flow control at this layer, the router is simply forced to let some messages go over the network and the remainder are silently discarded. Due to the huge numbers of packets flowing through central Internet routers at any point in time, the scenario described above (along with other situations which result in packet loss) occurs many thousands, perhaps millions of times per day throughout the Internet.

Existing protocols are forced to deduce that datagrams have been discarded by the fact that some of the expected traffic is not received. Also, existing protocols simply react to data loss by drastically slowing their rate of transmission and retransmitting lost data.

As noted above, TCP is the primary protocol for transmitting data long distance today. However, TCP has at least two major problems: (1) it is slow in the face of latency; and (2) it does not handle packet loss gracefully.

The reality is that no matter how much bandwidth is available, the mechanics of TCP involve procedures that, once latency crosses a threshold, the transmission process experiences dead time (where no new transmission is taking place while the sender is waiting for acknowledgements of data receipt from the receiver) and repeated retreats from transmission aggressiveness.

An underlying reason why hitting this transmission threshold is such problem relates to the way all variations of TCP respond to apparent transmission difficulties (e.g., data corruption and/or loss). Essentially, TCP implementers recognized that TCP, by its nature, fundamentally handles data corruption and loss extremely ungracefully. As long as transmission is proceeding cleanly and uninterrupted, data flow is consistent. The necessity to recover from a bad or missing transmission, however, involves temporary termination of transmission of new data while the system goes back and locates old data required by the receiver, retransmitting these data, and waiting for acknowledgement of receipt of that retransmission. This oversimplification of TCP behavior is mitigated by overlapping transmission of new and old data but it does capture the essence of the susceptibility of TCP to communication problems. In practice, any and all single disruptions of clean data flow in the network cause out-of-proportion disruptions of data flow internally in TCP behavior.

In light of this heavy impact of data corruption and loss, TCP does all it can to avoid such situations. Its primary defense mechanism is to slow down (or temporarily suspend) transmission to reduce exposure to problems. To accomplish this, a "congestion avoidance" mechanism precipitously decreases the rate data are injected into the network as soon as any resistance is met. As will be discussed in more detail below, TCP effectively behaves according to an expect-the-worst attitude whereby it starts with a slow transmission rate, accelerates as long as it meets no resistance in the form of data corruption or loss, and then retreats to its original rate (or some middle ground) upon such resistance.

Increasing bandwidth does, in fact, reduce the number of times dead time is suffered. On the other hand, sending more data at a time increases the transmission time of each block of data from the sender to the receiver. Similarly, using data compression of some type effectively increases the amount of data transmitted at any one time, but the fact remains that ineffective dead waiting time continues to be a major consumption of overall transmission time.

Compounding this dead waiting time issue is the algorithmic method that TCP uses to respond to network congestion or corruption that impacts the rate of data received by the receiver and the relative percentage of those data that are received intact and correct. Behaviorally, as the TCP receiver experiences success in receiving uncorrupted data and reports this success back to the sender in the form of its acknowledgments, the sender becomes more aggressive in its sending rate, arithmetically accelerating its rate of injecting data into the transmission stream. Once the receiver experiences a higher degree of failure than is allowed by its design, however, the result is precipitous. The increased failure rate is communicated explicitly and implicitly to the sender in the form of explicit notifications of corrupted datagrams and implicitly by the fact that the sender does not receive any acknowledgement of receipt of a datagram by the receiver (either successful or a notification of corruption). In response and by the design of TCP, the sender reduces its transmission rate geometrically and begins the arithmetic transmission acceleration process all over again.

One result of this additive-increase-multiplicative-decrease algorithm is that TCP transmission rates experience very distinct sawtooth behavior 203 as shown graphically in FIG. 2 in a data transmission rate graph 200. In contrast, various embodiments of a network protocol graph 201 of the present invention suffer much less of a dramatic impact of network congestion and corruption as graphically depicted.

In turn, actual communication throughput seldom approaches theoretical throughput. In fact, as shown in FIG. 1 above by the typical approach (shown by the sawtooth behavior 203 of the prior art) to increasing throughput—increasing bandwidth—actually experiences severe diminishing returns.

Attempts to move large amounts of data over merchant Internet connections with high latency and periodic packet loss can be frustrating and slow. Prior art protocols seldom achieve more than a few percent of a theoretical channel capacity between sender and receiver. Further, transfers often fail.

In an illustrative example, conventional TCP theory states that the optimal receive window size is the product of the channel bandwidth and the round trip time. For instance, if the channel's bandwidth is 100 megabits/second and the ping time (approximating the round trip time) is 700 milliseconds, then an optimal buffer size is $$100 \frac{\text{megabits}}{\text{second}} \times 700 \text{ milliseconds} = 100 \cdot 10^6 \frac{\text{bits}}{\text{second}} \times 0.7 \text{ seconds} =$$

$$70 \times 10^6 \text{ bits} = 70 \times 10^6 \text{ bits} \times \frac{1 \text{ byte}}{8 \text{ bits}} = 8.75 \times 10^6 \text{ bytes}$$

In other words, this configuration would require approximately 9 megabytes of buffering assuming a true, zero loss channel as described.

If the buffer is too small, then the sender transmits until it believes that the receive buffer could be full (assuming no lost data), and then pauses for the acknowledgement. This results in 'dead time' or lost throughput.

If the buffer is too large, then the sender transmits as quickly as its timers allow until it begins to lose packets by overestimating the bandwidth of the channel. Then TCP begins to fluctuate its transmission rate as described below.

Another problem with TCP is inherent in all "sliding window" schemes. In essence, once a connection is created between the end points, the sender and receiver keep track of the amount of data which have been sent and how much space is left in the negotiated window. (The sender and receiver each reserve a memory buffer the size of the window.) The receiver acknowledges receipt of data which causes the window to progress through the data stream. However, at any point in time, there can never be more unacknowledged data than the window's size. In connections where the throughput is proportionally faster than the latency, the sender can send the entire window and then be forced to wait a period of time for the requisite acknowledgement to arrive from the receiver.

Further, TCP utilizes a congestion control system comprising "slow-start" and "congestion avoidance" aspects. In both of these areas, the traffic monitoring mechanism is dependent on the receipt of acknowledgements from the receiver that data have been successfully received. Failure to receive such an acknowledgement is interpreted to mean that data failed to reach the sender. In fact, however, such failure to receive an acknowledgement (in the time allotted) may in actuality be due to the fact that the acknowledgement itself was lost or corrupted or simply delayed due to traffic congestion. In other words, the traffic monitoring and controlling system is subject to the same problems to which the data transmission itself is subject. This is particularly deleterious, of course, in more error-prone environments such as wireless systems.

At all times, TCP maintains a "congestion window" that contains all unacknowledged data that are currently in transit (i.e., has been sent by the sender and the sender has not yet received an acknowledgement of successful receipt from the receiver). This congestion window starts out small and is increased during slow-start and congestion avoidance in reaction to successful transmissions.

Slow-start algorithms are implemented to "feel the network out" to avoid over-loading a network with more data than it can gracefully handle. Such systems work by sending either a small amount of data, or data at a low rate, in the beginning and increasing the amount sent each time an acknowledgement is received until either an acknowledgement is not received or a threshold is reached. Once either of these events occurs, the system enters a congestion avoidance phase.

Different congestion avoidance schemes have been put in place over the years (e.g., "Tahoe," "Reno," and "New Reno"); all of these schemes are variations on the theme of retreating on transmission aggressiveness in the face of data corruption/loss. In all cases, the rate of retreat is rapid and subsequent recovery relatively slow resulting in the sawtooth behavior 203 described with reference to FIG. 1, above.

In all implementations of TCP, transmission is very sensitive to data loss. Loss of a packet causes the receiver to time out and resend an acknowledgement in the hope that the sender will deduce that one or more messages have been lost and must be retransmitted. However, the loss of a single message can drastically slow a TCP transfer due to the internal timing of the protocol as described above with respect to the sawtooth behavior of TCP. Simply enlarging the window helps some, but ultimately real-world considerations, such as packet loss, reduce and ultimately nullify any gains.

The challenge of controlling the rate of injecting data into the transmission system would be daunting enough considering the factors described above but another major disruption involves the continuously changing aspect of the effective bandwidth available for the transmission. In reality, the effective bandwidth available to a sophisticated transmission system like many of those in the prior art where alternative communication paths are accessed and, of course, traffic congestion is constantly in a state of flux, is not a fixed constant defined by the size of the transmission line accessed by the user. Further, and compounding the problem to a point of virtual unpredictability, is the fact that the rate of data corruption/loss is also constantly changing. Due to constant changes in traffic congestion and other mitigating factors, the rate of data corruption/loss on just one communication line can change constantly, quickly, and unpredictably. Use of multiple communication paths increases this variability.

The rate of change is so rapid, in fact, that controlled pacing of traffic can, in essence, be so far out-of-phase with the actual available effective bandwidth that the controlling algorithm can have a deleterious impact on true throughput. In other words, the controlling algorithm can be injecting high volumes of data into a network at the exact time the network is susceptible to high transmission failures and vice-versa. A net result is that the sender is not taking advantage of potentially high volume clean transmission environments. Arguably much worse, it can flood congested and dirty networks resulting in extremely high data corruption/loss which leads to algorithmic slowing down of the transmission rate. In essence, this behavior can actually pre-determine that a transmission will take place at a much less than optimum rate during periods of traffic contention and/or corruption.

In reality, the only consistent way of dealing with all the degrees of uncertainty summarized above is to simply ignore them. Therefore, a new data transmission scheme is required.

However, there are reasons to believe that merchant Internet connections will not be getting much better in the near future. Increased availability of satellite connections (with very long latencies) makes them an economical alternative for high bandwidth transfers. Centralization of routing and connectivity dictates that long distance communications will continue to traverse multiple core routers where memory shortages and other circumstances may force packets to be discarded. In other words, as the Internet becomes bigger and faster, its latency and loss characteristic is likely to continue and to remain roughly proportional to contemporary experience (or worse).

One fundamental source of latency delay in long distance data transmission is the fact that the transmitting device inputs an amount of data into the transmission network and then waits for an acknowledgement from the receiver that the data have been successfully received, received but corrupted in some way or, when no acknowledgement is ever received, were not received at all. Depending on the status of the transmission, either those data are retransmitted or the next amount of data in the source file is transmitted.

If less data are actually transmitted (for example, through data compression or delta processing), the number of times the receiver must waste time waiting for acknowledgements is reduced. Several prior art schemes have taken advantage of this by merely transmitting less data.

However, merely transmitting less data will not solve the problem. The reliability of transmission networks decreases as the amount of congestion increases. The more a transmission source stresses the network by sending too much data too fast, the higher the rate of data corruption and loss (thereby demanding retransmission of data) becomes. Transmitting data at an artificially low volume and/or rate in order to protect the integrity of the transmission results in artificially low transmission rates. Several prior art schemes have addressed this problem by reactively reducing or increasing transmission volumes and rates in response to increased or decreased data loss and corruption. Other prior art schemes have addressed this problem by proactively reducing or increasing transmission volumes and rates by attempting to predict traffic congestion ahead of time and changing the rates accordingly.

Still other prior art methodologies have addressed this problem by identifying and taking advantage of multiple data transmission paths to the receiver and distributing the transmission among those paths.

The impact of the sender having to wait for receipt of an indication from the receiver that erroneous data have been received (or a lack of any notification from the receiver that a certain set of data has been received correctly or with errors) before sending subsequent sets of data is severe enough that it can be beneficial in prior art systems for the sender to actually send redundant data in the first place.

Under certain conditions, depending on the types of data corruption experienced and/or the amount of redundant data transmitted, data errors can be corrected by the receiver, thus reducing the amount of data retransmission required by the sender.

World-wide networks used in standard data transmission include a "Quality of Service" (QOS) facility by which different kinds of network traffic are prioritized (e.g., voice over IP has a higher priority than e-mail). The QOS facility can be managed to assist in assuring maximum throughput for a communication.

However, whether reactive or proactive, none of the techniques copes with latency in the manner of the present invention. All of the prior art methodologies continue to depend on back-and-forth communication between sender and receiver periodically while data transmission is suspended awaiting that communication.

SUMMARY

In various exemplary embodiments, a method of transferring data between a sender and a receiver in a packet-based network is disclosed. The method comprises establishing a data channel, establishing a feedback channel, sending data to the receiver over the data channel, sending an acknowledgment to a sender on the feedback channel at a predetermined interval, using the acknowledgment to track data sent successfully and unsuccessfully to the receiver, resending data unsuccessfully sent to the receiver, and self-tuning to optimize throughput based upon the acknowledgement and react to changing network conditions.

In other exemplary embodiments, a processor-readable storage medium storing an instruction that, when executed by a processor, causes the processor to perform a method for accelerating transmission of data is disclosed. The method comprises establishing a data channel, establishing a feedback channel, sending data to the receiver over the data channel, sending an acknowledgment to a sender on the feedback channel at a predetermined interval, using the acknowledgment to track data sent successfully and unsuccessfully to the receiver, resending data unsuccessfully sent to the receiver, and self-tuning to optimize throughput based upon the acknowledgement and react to changing network conditions.

In other exemplary embodiments, a system to accelerate transmission of data between a first and second endpoint of an inter-network is disclosed. The system comprises a data channel configured to transmit packets of data over the inter-network, a feedback channel configured to transmit a plurality of acknowledgement data and optimization data over the inter-network, and a sender unit coupled to the data channel and the feedback channel and comprising the first endpoint of the inter-network. The sender unit is configured to establish the feedback channel, send data to the second endpoint, and track data sent to the second endpoint. A receiver unit is coupled to the data channel and the feedback channel and comprises the second endpoint of the inter-network. The receiver unit is configured to establish the data channel and send an acknowledgement to the sender unit at a predetermined interval.

BRIEF DESCRIPTION OF THE DRAWINGS

The appended drawings illustrate exemplary embodiments of the present invention and must not be considered as limiting its scope.

DETAILED DESCRIPTION

Figure 1:
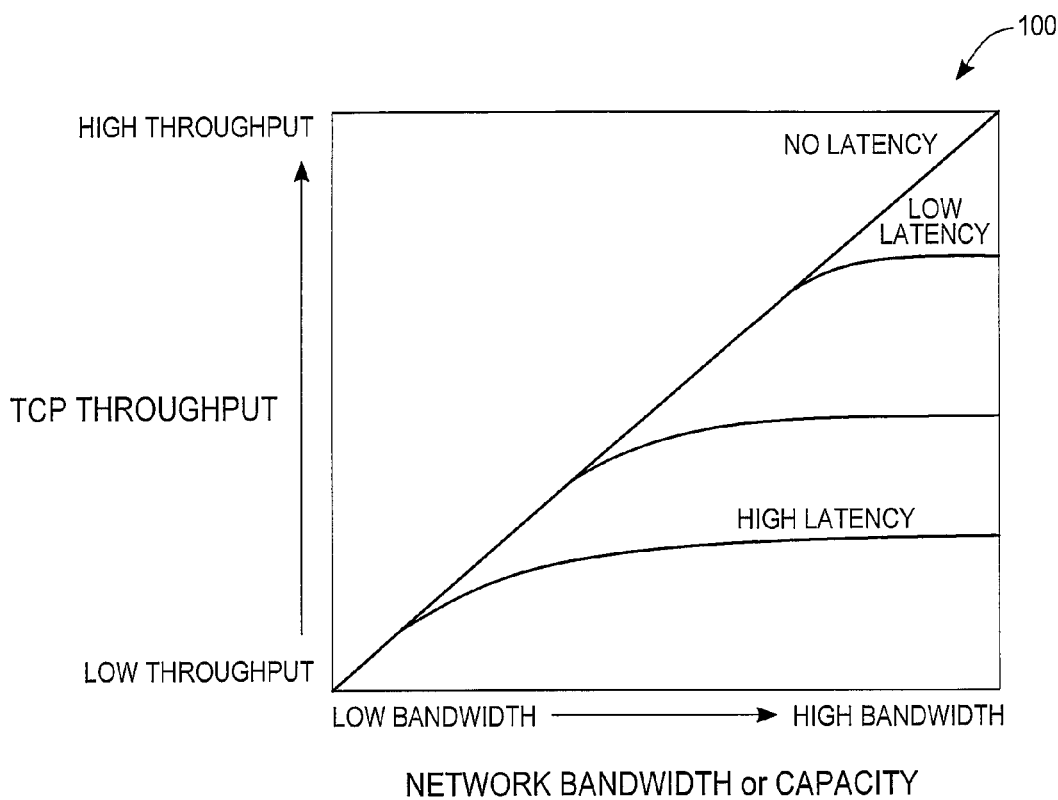
FIG. 1 is an exemplary graph illustrating TCP throughput levels as a function of network bandwidth or capacity.
Figure 2:
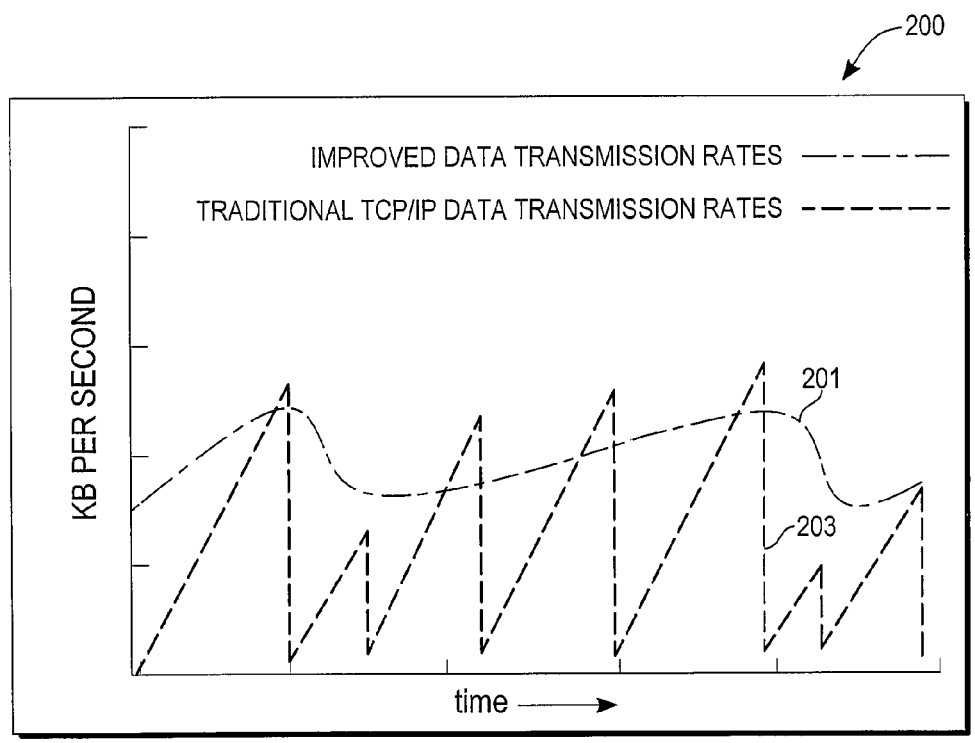
FIG. 2 is an exemplary graph comparing data transmission rates of traditional protocols with the protocol of the present invention as a function of time.

The present invention is a novel protocol to transfer data between electrical devices or nodes over an inter-network, or the Internet. Historically, as discussed above, approaches to addressing issues of latency have involved mitigation of the problem by effectively reducing an amount of data actually transmitted, controlling a rate and traffic flows of the data which are transmitted, and minimizing an amount of data which need to be retransmitted due to data loss and corruption.

The present invention is thus at least partially based on the concept of injecting data into the transmission network at a precomputed optimal rate which is continually refined. In general terms, the present invention uses the Internet as a storage device along the same lines as a shipper may consider a freighter at sea to be a mobile warehouse. Coordinating accounting is maintained between the sender and the receiver monitoring the success or failure of transmission of each amount of data transmitted. Periodically, the receiver notifies the sender of the status of receipt of each amount of data and the sender reacts accordingly by retransmitting necessary data.

The rate of data injection is optimized to maximize the amount of data received per unit of time while minimizing the rate of data loss and corruption. This is accomplished by measuring the precise amount of time taken by each data set to be received by the receiver, sending this information back from the receiver to the sender and then subjecting these data to a congestion prediction system.

In an exemplary embodiment, the present invention is a new and novel networking protocol which can be implemented in a variety of ways in either hardware, firmware, or software (or a mix thereof). The new networking protocol provides a superset of the abstraction provided by TCP (a "stream socket"). The protocol can be implemented using TCP and User Datagram Protocol (UDP) on most common networked computers and is ideal for transmitting huge amounts of data over high latency, lossy Internet connections.

Associated software or firmware may be provided as a computer program product which may include a computer-readable medium having stored thereon instructions which, when read, cause a computer (or other electronic device) to perform a process or method. The computer-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other types of media/computer-readable medium suitable for storing electronic instructions. Moreover, the software may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a computer-readable medium.

The protocol uses datagrams for data movement and some form of feedback channel for control. Exemplary embodiments shown and described in FIGS. 3 through 5, referenced below, will assist in understanding the following discussion.

Figure 3:
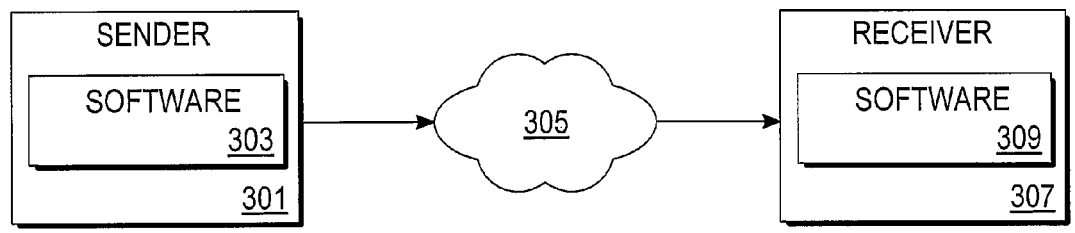
FIG. 3 is an exemplary schematic of a sender and a receiver in an inter-network environment.

With reference to an exemplary embodiment shown in FIG. 3, a sender 301 is connected to a receiver 307 via a data channel 305 such as an inter-network connection or over the Internet. Both the sender 301 and the receiver 307 are running a sender protocol software 303 and a receiver protocol software 309, respectively, for implementing the new protocol. The sender 301 and the receiver 307 may be running other software (not shown) as required for device and network operations.

With continued reference to FIG. 3, the sender 301 establishes a feedback connection and exchanges an initial state (e.g., bookkeeping information), including a current time at the receiver 307. The sender 301 therefore opens the feedback connection and listens; this is, in essence, a handshake portion of the protocol. The actual handshake begins at the receiver 307 and is replied to by the sender 301. The receiver 307 generates an estimate of the round trip time (RTT) from the handshake. The sender 301 then begins to transmit datagrams (not shown) to the receiver 307 over the data channel 305 through, for example, the Internet or some other network structure. Both the feedback connection and the data channel are discussed in more detail, below.

There are two exemplary modes in which the sender may operate, a "retransmit mode" and a "pluribus mode." Each of these exemplary modes is described in detail, below.

Retransmit Mode

Once the data channel 305 is established, the receiver 307 continuously sends synchronization messages to the sender 301 at a monotonic rate. The synchronization message includes a timestamp and throughput information including the number of datagraras lost or corrupted since a previous synchronization message. Each datagram sent is assigned an identification which is generated and used in sequence so that the receiver 307 can detect missing or corrupted datagrams. The identification may be semi-unique or unique, depending upon a given embodiment employed. The identification is also saved by the sender 301 on a list of unacknowledged datagrams. The sender 301 transmits datagrams to the receiver 307 via the data channel 305 continuously and without pause until there are no remaining data to send.

As the receiver 307 collects datagrams over the data channel 305, the receiver 307 periodically sends an acknowledgement to the sender 301 (via the feedback channel). To minimize traffic and maximize efficiency, the receiver 307 only sends the highest consecutive identification successfully received thus far. This acknowledgement message may either be sent instead of the synchronization message, appended to the synchronization message, or between synchronization messages. The receiver 307 keeps track of all missing identifications. In a specific exemplary embodiment, the optimum rate of acknowledgement messages is, at a minimum, slightly more than half the RTT estimate.

When the sender 301 receives an acknowledgement message, the sender 301 removes all applicable identifications from its list of unacknowledged datagrams.

If the receiver 307 receives a healthy datagram seemingly out of sequence, then there are two cases to be considered: (1) the packet is filling in a previous gap; or (2) the packet is 'early.'

In the former case, the new datagram should match one of the outstanding missing identifications. Then the receiver 307 simply accepts the data (placing it in sequence in the data stream), and updates its missing ID table. When the next acknowledgement message is sent, the identification acknowledged may be this identification or a higher one if this datagram fills a known gap in the sequence.

If the packet is early, the receiver 307 generates a gap of lost datagrams and waits for the gap to be filled. Otherwise, the datagram is discarded as a duplicate or undiscovered corruption. In a specific exemplary embodiment, notification is sent to the sender 301 for the corruption.

The receiver 307 has the option of sending a negative acknowledgement message via the feedback channel. This message may be sent immediately or may be accumulated with other acknowledgements for periodic transmission back to the sender and may contain the ID of an out-of-sequence datagram.

The sender 301 monitors the apparent time difference between the sender 301 and the receiver 307 by subtracting a timestamp from the receiver 307 from an idea the sender 301 has of the current time. While the two computers may have significantly different ideas as to the time, the two notions should progress at essentially the same rate of one second per second. The variation in the difference between the two values can be used to predict the congestion and health of the intervening network. In times of congestion, the network may appear to slow the delivery of acknowledgements while during times of light loading the latency should be reduced somewhat. The actual mechanism used is described in more detail below.

If the sender 301 determines that the network is becoming congested, then it may choose to take one or more of several courses of action including, but not limited to:
  slowing down transmission;
  creating an additional data channel (ideally using another path free of congestion);
  slowing transmission and spending more compute resources on, for example, compression to maintain throughput while reducing bandwidth demand;
  altering Quality of Service (QOS) bits in the IP header; and/or
  instructing external network devices such as routers and firewalls to alter routing and load sharing.

Conversely, if the sender 301 determines that the network is becoming less congested, it may then choose to take more aggressive steps including, but not limited to, boosting transmission rates, shutting down auxiliary data channels, or reducing compression.

If the sender determines that the network is becoming unnecessarily lossy, or dropping too many datagrams, the sender may choose to invoke one or more remedies including, but not limited to:
  slowing down transmission;
  altering datagram size;
  employing or enhancing forward error correction to allow the receiver to recreate lost datagrams without retransmission (this may or may not be used with associated data compression);
  altering Quality of Service (QOS) bits in the IP header;
  instructing external network devices such as routers and firewalls to alter routing and load sharing; and/or
  informing a human that something in the network has deteriorated.

Pluribus Mode

In this exemplary embodiment, datagrams to be transmitted are divided into cohorts or groups of datagrams of a fixed cardinality. (Without loss of generality, assume a cohort size is 128 for the following discussions.) Then, using the Pluribus mode, (see 'Systems, Methods and Computer Program Products Including Features for Coding and/or Recovering Data' by Robert Cousins, a Provisional Patent Application to Robert E. Cousins, Ser. No. 60/925,502, filed Apr. 19, 2007, and which is hereby incorporated by reference in its entirety), the cohort of datagrams is converted into a supply of redundant datagrams. The supply of redundant datagrams will have the same or more datagrams than the original cohort. (In a specific exemplary embodiment, the Pluribus technology allows the original cohort of datagrams to be recovered from any 100 of the redundant datagrams.)

The sender 301 transmits the redundant datagrams as described above. Each datagram is given a sequence number and a cohort number. Cohort 1 is sent prior to cohort 2, and so on, in sequence.

If the receiver 307 receives 100 redundant datagrams in a cohort, then the receiver 307 invokes the pluribus mode and recovers the original datagrams and their associated payloads. Next, the receiver 307 acknowledges the correct receipt of the cohort to the sender 301.

However, if the receiver 307 does not receive all 100 datagrams, the receiver 307 selects a cutoff point to decide when datagrams for the given cohort will not arrive. This cutoff point could be after a specific number of datagrams of the following cohort have arrived, a time-based measurement or some other appropriate measure. At this point, the receiver 307 informs the sender 301 that the receiver 307 is in need of a specific number of datagrams (100-number received) to complete the cohort. The sender 301 will then send at least the requested number of datagrams to the receiver 307 (i.e., the sender 301 sends new redundant data proportional to an amount of data requested). This process may be repeated if additional datagrams are lost. The sender 301 may choose to send additional datagrams to reduce the possibility of looping again.

In a specific exemplary embodiment, the sender 301 may optionally keep track of a probable packet loss rate for a cohort and include additional datagrams in the outgoing data stream such that the receiver 307 will likely receive 100 or more uncorrupted datagrams.

Acknowledgements from the receiver 307 to the sender 301 include a cohort number and a number of datagrams desired. A number less than one indicates that the cohort has been completely received and processed. In this case, a digital signature of the original cohort is also returned with the count. The count is a signed number. A value of zero indicates that 100 datagrams were received. A value of −n indicates that 100+n datagrams were received (and the sender 301 may choose to send, for example, n fewer datagrams the next cycle). A value of n indicates that the receiver is still in need of n datagrams.

The sender 301 does not pause between sending cohorts. The sender 301 sends cohorts back-to-back at full speed. The receiver 307 then receives cohorts continuously at full speed. These cohorts consist of original cohorts for a set of datagrams as well as recovery cohorts that have been previously requested from the sender 301 by the receiver 307. Original sets of cohorts are processed to recreate the original data as seen by the sender 301 prior to its generation of cohorts. When successful (which typically is the case the vast majority of the time since the original cohorts include sufficient data to recreate the original data without some major catastrophic network failure or corruption), those recreated original data are added by the receiver 307 to the final data file which is being built. Periodically, acknowledgements of such successful processing are sent back to the sender 301. When unsuccessful, acknowledgements are sent from the receiver 307 to the sender 301 requesting retransmission of cohorts as described above and the receiver 307 then holds the incomplete set of cohorts in abeyance awaiting the replacement cohorts from the sender 301.

The new protocol thus moves data from an inter-network node, the sender 301, to another node, the receiver 307, over an inter-network connection that supports existing network protocols of TCP, UDP, and IP. The TCP, UDP, and IP protocols move data over an inter-network in packets. Packets are fixed size frames of data. The new protocol makes use of these existing protocols. In a specific exemplary embodiment, no changes are made to IP, TCP, or UDP headers.

In one exemplary embodiment, the sender 301 establishes a TCP connection with the receiver 307. In other embodiments, a different type of connection may be established. In either case, the connection is referred to as the feedback channel. As discussed above, the sender 301 and the receiver 307 exchange initial bookkeeping information, called the handshake, on the feedback channel. The handshake begins with a packet sent from the receiver 307 to the sender 301 followed by a response packet from the sender 301 to the receiver 307. The bookkeeping information includes user authentication. Recall, as noted above, during the exchange of initial bookkeeping information, the receiver 307 measures the round trip time (RTT) of the handshake packet exchange.

The initial handshake may include authentication information, encryption keys, and other security information. A TCP connection may be for the feedback channel, but a wide variety of other mechanisms could be used as well.

The sender 301 then establishes a UDP connection with the receiver. (In other embodiments, a different connection may be established.) This connection is the data channel 305. In the case of a satellite channel, the feedback channel could use the same or a different path for data. For example, the datagrams could travel via the fast/long latency satellite path while the feedback channel could use a second communications path such as terrestrial Internet or even a dedicated modem or an RS-232 connection.

After the data channel 305 is established, the receiver 307 continuously sends synchronization packets (SYN) to the sender 301 at a constant periodic time interval. A SYN packet includes a timestamp and a count of the number of packets lost or corrupted since the last SYN packet was sent by the receiver 307.

The sender 301 begins sending packets derived from the source data to the receiver 307 on the data channel 305. The sender 301 sends data packets continuously, never stopping until the source of the data is exhausted. Each data packet is assigned a sequence number indicating the order in which it was derived from the source data. The sequence number is contained in the header information of each data packet. The sender also enters the data packet sequence number of each sent packet into an unacknowledged packet tracking system (UPTS). In one embodiment, the UPTS is a list. Other embodiments may feature a table or other tracking mechanism for the UPTS.

The receiver 307 collects packets from the data channel 305. The receiver 307 periodically sends an ACK packet to the sender 301 on the feedback channel reporting the highest consecutive data packet sequence number successfully received thus far. The receiver 307 sends an ACK packet by replacing a periodic SYN packet on the feedback channel. However, ACK packets are sent at a periodic time interval of no less than slightly more than the measured RTT divided by 2.0. In one embodiment, this interval is determined as the product of $$1.1 \cdot \frac{RTT}{2.0}.$$

Upon receipt of such an acknowledgement, the sender 301 removes all data packet sequence numbers less than or equal to the acknowledged sequence number from its UPTS.

If the receiver 307 collects a packet out of sequence, it first looks for the missing intervening sequence numbers in its missing packet tracking system (MPTS). Sequence numbers found in the MPTS are removed from the MPTS. Sequence numbers not found in the MPTS are added to the MPTS and then reported to the sender by immediately sending a negative acknowledgement (NAK) packet on the feedback channel. In a specific exemplary embodiment, the MPTS is a list. Other embodiments may feature a table or other tracking mechanism. Such alternative mechanisms would be known to one of skill in the art.

Figure 4:
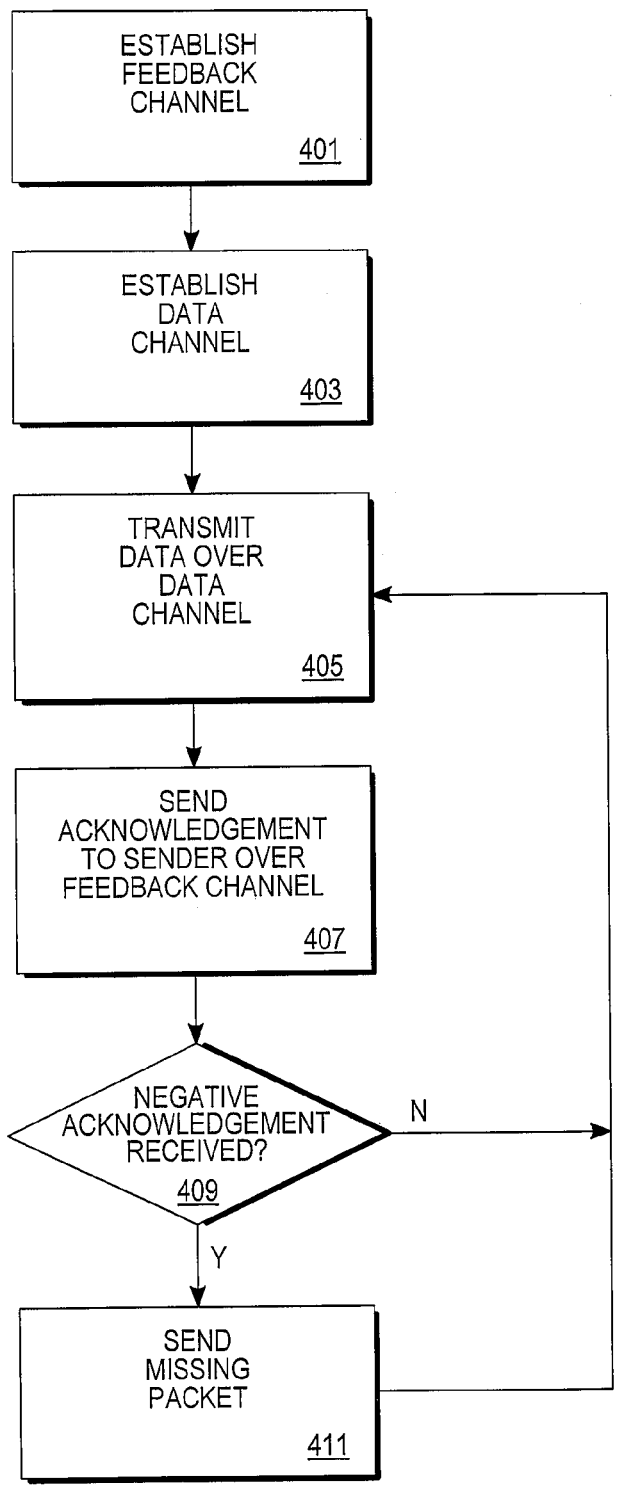
FIG. 4 is an exemplary flowchart of communications between the sender and receiver of FIG. 3.

With reference to FIG. 4, an exemplary flowchart of the new protocol's approach to transmitting data and tracking receipt of transmitted data is described in more detail. Once a feedback channel 401 and a data channel 403 are established as discussed above, data are transmitted over the data channel 405 and an acknowledgement is sent to the sender over the feedback channel 407. A determination is made whether a NAK packet has been received 409 on the feedback channel. If a NAK packet is received, the sender sends the missing packet or packets 411 on the data channel again at the next opportunity. If a NAK packet is not received, data are continued to be transmitted over the data channel 405.

Figure 5:
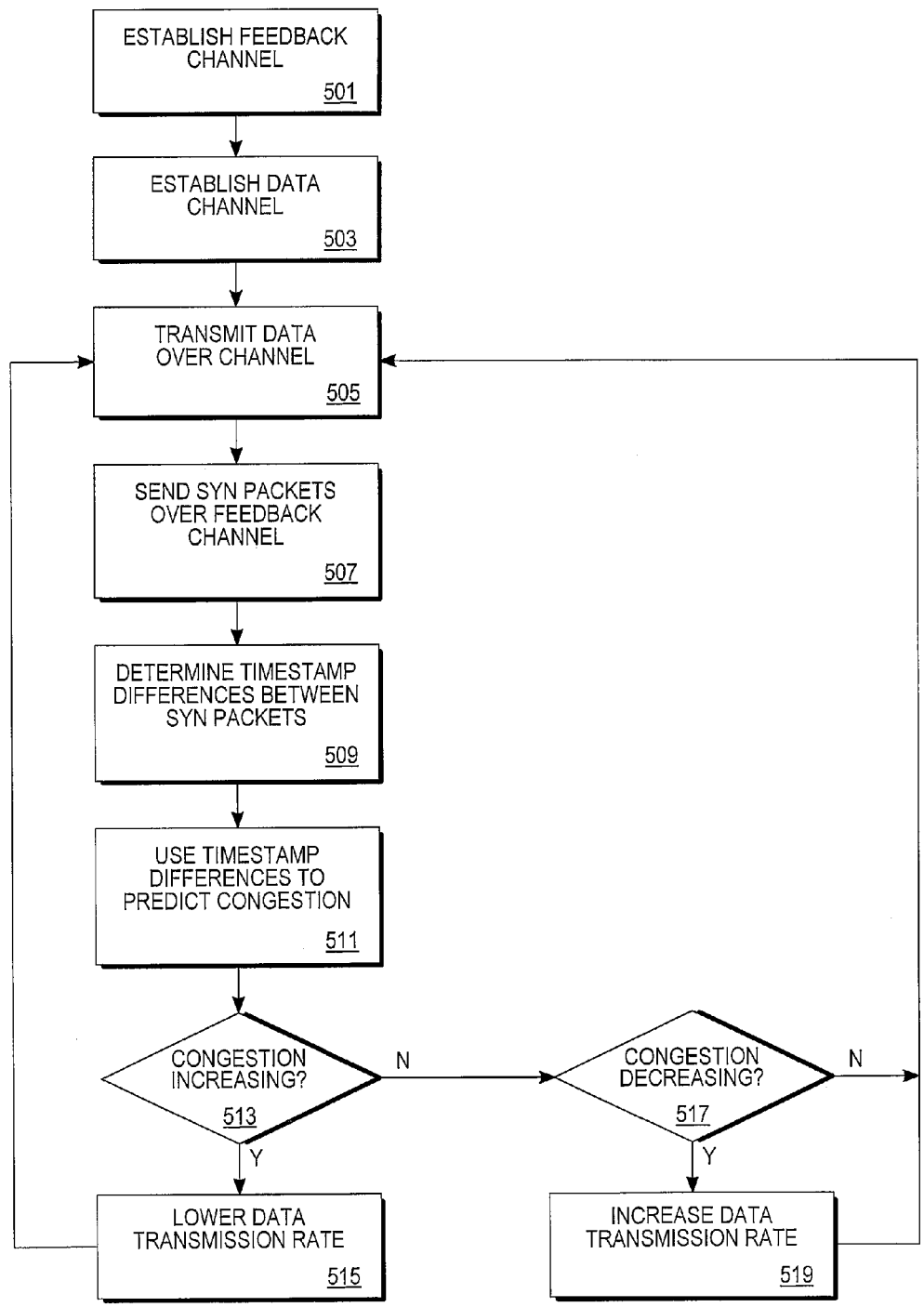
FIG. 5 is an exemplary flowchart of communication rate adjustments between the sender and receiver of FIG. 3.

With reference to FIG. 5, details of the synchronization (SYN) packet are discussed in an exemplary flowchart. As with FIG. 4, once a feedback channel 501 and a data channel 503 are established as discussed above, data are transmitted over the data channel 505. The receiver then periodically sends a SYN packet 507 over the feedback channel. Each periodic SYN packet that the receiver sends to the sender contains a timestamp. Upon receipt of each SYN packet, the sender subtracts its local timestamp from the timestamp extracted from the SYN packet to determine timestamp differences between SYN packets 509.

The first SYN packet sent from the receiver to the sender contains timestamp $T_{R0}$. The timestamp of the sender upon receipt of the first SYN packet is $T_{S0}$. The sender calculates the difference between $T_{R0}$ and $T_{S0}$ and saves the value as $T_0$. Thus, $$T_0 = T_{R0} - T_{S0}$$

The sender calculates the difference between the sender's timestamp and receiver's timestamp upon the reception of each subsequent SYN packet.

$$T_n = T_{Rn} - T_{Sn}$$

The sender then calculates the change in the timestamp difference, $\Delta T_n$, relative to the first timestamp difference, $T_0$.

$$\Delta T_n = T_n - T_0$$

The sender then uses each computed value of $\Delta T_n$ as input to predict congestion 511 in its congestion prediction system (CPS). The sender uses the CPS to predict the congestion of the network as it affects the transfer of data to the receiver. The sender uses the prediction of network congestion to determine whether to change the rate at which it is sending the data packets on the data channel. If congestion is increasing 513, the rate at which the sender sends packets on the data channel is lowered 515 so as to avoid packet loss and subsequent packet retransmission when additional data are transmitted over the channel 505. If congestion is decreasing 517, the data rate is increased 519 to take advantage of available transmission capacity when additional data are transmitted over the channel 505. If congestion is neither increasing 513 nor decreasing 517, then additional data are transmitted over the channel 505 at a continuous rate.

The congestion and loss notice system discussed above can be implemented in a number of ways as would be discernible to a person of skill in the art after reading and understanding principles of the present invention detailed herein. One implementation is based upon a CPS. However, other embodiments include fractal (strange attractor) analysis similar to established methods for predicting cardiac problems, simple statistical modeling, and models using external data beyond simple RTT derived values. One example could be that if the model could have Simple Network Management Protocol (SNMP) data from all intermediate routers (including queuing information, throughput information, drops counts, etc.), it would be possible to tune the sender even more accurately to eke out the maximum useable throughput.

The new protocol described herein could also provide end-to-end validation of data integrity in the form of a series of packet level checksum or error detecting codes.

In another embodiment, the receiver may be configured to provide more detailed information about missing datagrams to the sender. Similarly, the sender could choose to reply with error correction information instead of actual missing datagrams when informed of the loss of one or more datagrams within a finite sequence of datagrams.

Figure 6A:
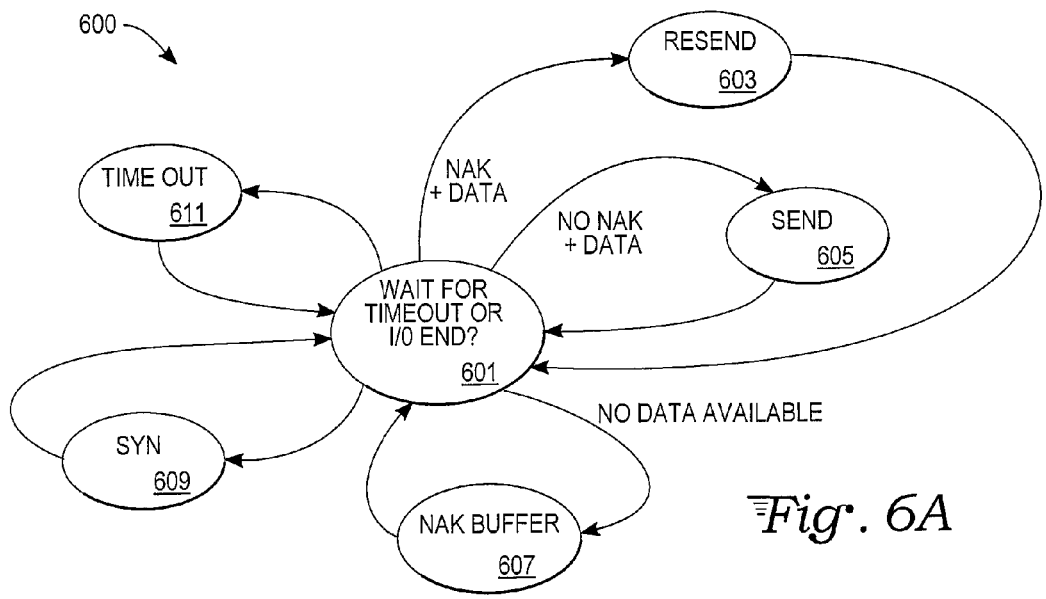
FIG. 6A is an exemplary sender state diagram in accord with various embodiments of the present invention.

With reference to FIG. 6A, an exemplary sender state diagram 600 includes a plurality of states including a wait for timeout or I/O end state 601 ("wait state"). Such state diagrams are readily understood by one skill in the art. The wait state 601 transitions to a resend state 603 upon an input of a "NAK+Data" input and then back to the wait state 601, to a send state 605 upon an input of "NO NAK+Data" and then back to the wait state 601, and to a NAK buffer 607 if no data are available and then back to the wait state 601. Upon receipt of a SYN packet, the wait state 601 transitions to a SYN state to process the SYN data and then back to the wait state 601. Also, a transition to a time out state 611 can occur prior to an end of any I/O data. A sender state transition table corresponding to FIG. 6A is found immediately below.

| LABEL | SENDER STATE | TRANSITION | NEXT |
|---|---|---|---|
| W | Wait for time out or I/O end | Got NAK + data | RS |
|  |  | Got no NAK + data | S |
|  |  | No data available | NAK |
|  |  | Time out? | TO |
|  |  | SYN period? | SYN |
|  |  | Error? | ERR |
| RS | Resend | Any | W |
|  |  | Error? | ERR |
| S | Send | Any | W |
|  |  | Error? | ERR |
| NAK | NAK buffer | Any | W |
|  |  | Error? | ERR |
| TO | Time out | Any | W |
|  |  | Error? | ERR |
| SYN | Send SYN | Any | W |
|  |  | Error? | ERR |
| ERR | Error message out | Any | EXIT |
| EXIT | Exit |  |  |

Figure 6B:
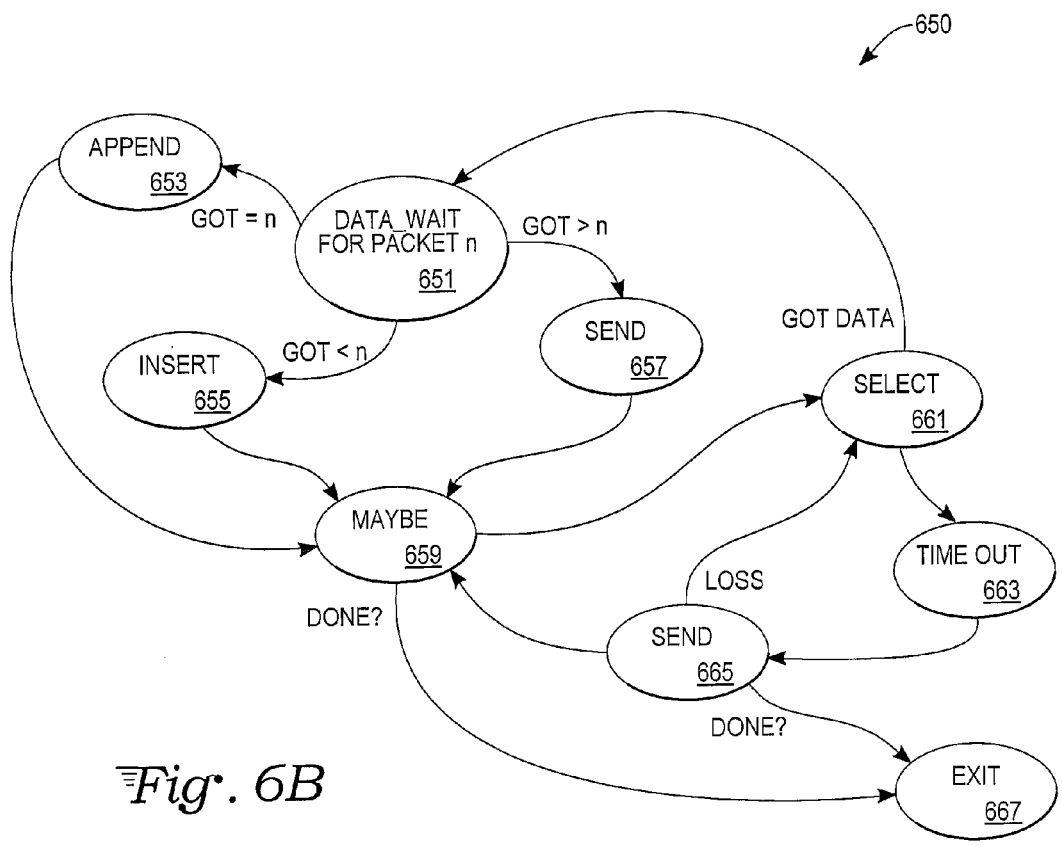
FIG. 6B is an exemplary receiver state diagram in accord with various embodiments of the present invention.

Referring now to FIG. 6B, an exemplary receiver state diagram 650 includes a Data_Wait for packet n state 651 ("data wait") that can transition upon an input of got=n, got<n, or got>n, where n is indicative of a number of expected datagrams or packets (see above). Upon one of the datagram-related inputs n, the data wait state will transition to an append state 653, an insert state 655, or a send state 657, respectively. Upon transitioning from any of these three states, an inquiry is made as to whether there may be more datagrams to be received by transitioning to a may be state 659. If there are no more datagrams, a transition is made to an exit state 667. Otherwise, a transition is made to s select state 661. From the select state 661, a transition may be made to either a time out state 663 or back to the data wait state 651. Alternatively, the select state 661 may transition to a command state (not shown). The time out state 663 transitions to a send state 665. If there are no more datagrams, the send state transitions to the exit state 667. Alternatively, the send state 665 will either transition back to the may be state 659 or to the select state 661 upon receipt of a loss input. A receiver state transition table corresponding to FIG. 6B is found immediately below.

| LABEL | RECEIVER STATE | TRANSITION | NEXT |
|---|---|---|---|
| DW | Data wait (for packet n) | Got = n | AP |
|  |  | Got < n | IN |
|  |  | Got > n | NAK |
|  |  | Error? | ERR |
| IN | Insert | Any | OUT? |
|  |  | Error? | ERR |
| AP | Append | Any | OUT? |
|  |  | Error? | ERR |
| OUT? | Maybe output | Done? | EXIT |
|  |  | Not done | SEL |
|  |  | Error? | ERR |
| NAK | Send NAK | Any | OUT? |
|  |  | Error? | ERR |

-continued

| LABEL | RECEIVER STATE | TRANSITION | NEXT |
| --- | --- | --- | --- |
| SEL | Select | Got data packet | DW |
| | | Time expired? | TO |
| | | Got command | CMD |
| | | Error? | ERR |
| TO | Time out | Any | SYN |
| | | Error? | ERR |
| SYN | Send SYN | Loss? | SEL |
| | | Done? | EXIT |
| | | Otherwise | OUT? |
| | | Error? | ERR |
| ERR | Error message out | Any | EXIT |
| | | Error? | ERR |
| EXIT | Exit | | |

The present invention is described above with reference to specific embodiments thereof. It will, however, be evident to a skilled artisan that various modifications and changes can be made thereto without departing from the broader spirit and scope of the present invention as set forth in the appended claims. For example, particular embodiments presented and others envisioned after reading and understanding the underlying principles may be implemented by hardware, firmware, or software elements, or combinations thereof, as would be recognized by a skilled artisan. Further, predictive methods for congestive data flow prediction may employ mathematical or statistical models from modeling systems known in the art including Bayesian modeling, Erlang queueing, Little's low/saddlepoint method, packet delay/loss modeling or other similar techniques. These and various other embodiments are all within a scope of the present invention. The specification and drawings are, accordingly, to be regarded in an illustrative rather than a restrictive sense.

What is claimed is:

1. A method of transferring data between a sender and a receiver in a datagram-based network, the method comprising:
    establishing a data channel along at least one path between the sender and the receiver;
    establishing a feedback channel along at least one path between the receiver and the sender separate from the data channel;
    using one or more synchronization messages periodically sent over the feedback channel to determine network traffic times;
    sending data to the receiver over the data channel continuously until a source of the data is exhausted or paused by the receiver, the data being sent at a rate that maximizes use of available bandwidth with respect to the sender in the established data channel;
    sending both acknowledgment messages and negative acknowledgments to the sender on the feedback channel at predetermined intervals;
    using the acknowledgment messages and negative acknowledgments to track data sent to the receiver;
    resending data unsuccessfully sent to the receiver;
    self-tuning by the sender of the data rate to optimize throughput based upon a combination of overall latency and datagram loss rate in the data channel as determined from the content of the acknowledgment messages and negative acknowledgments and react to any changing network conditions so as to keep the datagram loss rate below a specified upper bound; and
    instructing at least one external network device along the established data channel to alter routing and load sharing in order to use multiple alternate paths to increase bandwidth.

2. A non-transitory processor-readable storage medium storing a set of instructions that, when executed by a processor, causes the processor to perform a method for accelerating transmission of data, the method comprising:
    establishing a data channel along at least one path between a sender and a receiver;
    establishing a feedback channel along at least one path between the receiver and the sender separate from the data channel;
    using one or more synchronization messages periodically sent over the feedback channel to determine network traffic times;
    sending data to the receiver over the data channel continuously until a source of the data is exhausted or paused by the receiver, the data being sent at a rate that maximizes use of available bandwidth with respect to the sender in the established data channel;
    sending both acknowledgment messages and negative acknowledgments to the sender on the feedback channel at predetermined intervals;
    using the acknowledgment messages and negative acknowledgments to track data sent to the receiver;
    resending data unsuccessfully sent to the receiver;
    self-tuning by the sender of the data rate to optimize throughput based upon a combination of overall latency and datagram loss rate in the data channel as determined from the content of the acknowledgment messages and negative acknowledgments and react to any changing network conditions so as to keep the datagram loss rate below a specified upper bound; and
    instructing at least one external network device along the established data channel to alter routing and load sharing in order to use multiple alternate paths to increase bandwidth.

3. A system to accelerate transmission of data between a first endpoint and a second endpoint of an inter-network, the system comprising:
    a data channel configured to transmit datagrams over at least one path of the inter-network;
    a feedback channel separate from the data channel and configured to transmit a plurality of acknowledgment messages and negative acknowledgments over at least one path of the inter-network and using one or more synchronization messages periodically sent over the feedback channel to determine network traffic times;
    a sender unit coupled to the data channel and the feedback channel and comprising the first endpoint of the inter-network, the sender unit configured to establish the feedback channel, send data to the second endpoint continuously until a source of the data is exhausted or paused by a receiver unit, the data being sent at a rate that maximizes use of available bandwidth with respect to the sender in the data channel independent of inter-network latency, and track data sent to the second endpoint, the sender also self-tuning the data rate to optimize throughput based upon a combination of overall latency and datagram loss rate in the data channel as determined from the content of acknowledgment messages and negative acknowledgments received on the feedback channel so as to keep the datagram loss rate below a specified upper bound;
    a receiver unit coupled to the data channel and the feedback channel and comprising the second endpoint of the inter-network, the receiver unit configured to establish the data channel and send both acknowledgment messages and negative acknowledgments to the sender on the feedback channel at predetermined intervals; and at least one external network device along the data channel of the inter-network and responsive to instructions by the sender to alter routing and load sharing in order to use multiple alternative paths of the data channel to increase bandwidth.

\* \* \* \* \*